US007241031B2

(12) United States Patent
Sloan et al.

(10) Patent No.: US 7,241,031 B2
(45) Date of Patent: Jul. 10, 2007

(54) CHANNEL LETTER LIGHTING SYSTEM USING HIGH OUTPUT WHITE LIGHT EMITTING DIODES

(75) Inventors: Thomas C. Sloan, Santa Barbara, CA (US); Bruce Quaal, Ventura, CA (US)

(73) Assignee: SloanLED, Inc., Ventura, CA (US)

( * ) Notice: Subject to any disclaimer, the term of this patent is extended or adjusted under 35 U.S.C. 154(b) by 169 days.

(21) Appl. No.: 11/106,912

(22) Filed: Apr. 14, 2005

(65) Prior Publication Data

US 2005/0231943 A1 Oct. 20, 2005

Related U.S. Application Data

(60) Provisional application No. 60/652,483, filed on Apr. 14, 2004.

(51) Int. Cl.
*F21V 29/00* (2006.01)
*B60Q 1/06* (2006.01)

(52) U.S. Cl. ....................... 362/373; 362/240; 362/812

(58) Field of Classification Search ................ 362/218, 362/231, 249, 294, 373, 545, 547, 812, 240; 40/544, 550, 551

See application file for complete search history.

(56) References Cited

U.S. PATENT DOCUMENTS 5,299,109 A 3/1994 Grondal ...................... 362/241
5,404,282 A 4/1995 Klinke et al. ............... 362/249
5,450,301 A 9/1995 Waltz et al. ................ 362/231
5,640,792 A 6/1997 Smith et al. .................. 40/546
5,660,461 A 8/1997 Ignatius et al. ............. 362/241
5,697,175 A 12/1997 Schwartz ..................... 40/552
5,729,925 A 3/1998 Prothero ...................... 40/570
5,808,592 A 9/1998 Mizutani et al. .............. 345/83
5,927,845 A 7/1999 Gustafson et al. .......... 362/152

(Continued)

OTHER PUBLICATIONS

Lumleds, "Red Super Flux Led Rail" Data Sheet, HLCR-KS99-R0100, HLCR-KS99-R0200, p. 9-11.

(Continued)

*Primary Examiner*—Ali Alavi
(74) *Attorney, Agent, or Firm*—Koppel, Patrick, Heybl & Dawson

(57) ABSTRACT

A channel letter lighting system according to the present invention comprising a channel letter housing with a translucent channel letter cover. A plurality of electrically connected lighting units are mounted to the channel letter housing and conductors provide an electrical signal to each of the units. Each of the units comprises a lighting unit housing and a printed circuit board (PCB) mounted within said housing. The PCB has a plurality of light emitting elements, such as light emitting diodes, with the electrical signal applied to the light emitting elements causing them to generate light substantially away from the housing. The PCB conducts and dissipates heat from the light emitting elements, the unit further comprises a space between most of the PCB and the lighting unit housing to allow heat from the PCB to dissipate into the surrounding ambient. A mounting mechanism is included for each unit to the channel letter housing.

27 Claims, 7 Drawing Sheets

U.S. PATENT DOCUMENTS

| | | | | |
|---|---|---|---|---|
| 5,931,577 | A | 8/1999 | Ishibashi | 362/800 |
| 5,949,347 | A | 9/1999 | Wu | 340/815.45 |
| 5,954,423 | A | 9/1999 | Logan et al. | 362/235 |
| 6,042,248 | A | 3/2000 | Hannah et al. | 362/252 |
| 6,065,854 | A | 5/2000 | West et al. | 362/249 |
| 6,578,986 | B2 | 6/2003 | Swaris et al. | 362/249 |
| 6,660,935 | B2 * | 12/2003 | Southard et al. | 362/640 |
| 6,924,973 | B2 * | 8/2005 | Kim | 361/679 |
| 6,964,507 | B2 * | 11/2005 | Mohacsi | 362/545 |
| 2003/0063463 | A1 * | 4/2003 | Sloan et al. | 362/238 |
| 2006/0087844 | A1 * | 4/2006 | Swaris et al. | 362/249 |

OTHER PUBLICATIONS

Gelcore Data Sheet, "GE Led System for Channel Letter Illumination", no date.

GE Lighting Product News, "Gelcore Led Channel Letters", no date.

Golden Dragon, Green Product-PB Free Leads, LW W5SG, Opto Semiconductors, Osram, Nov. 19, 2003, pp. 1-15.

National Semiconductor, LM117/LM317A/LM317, 3-Terminal Adjustable Regulator, May 2003, pp. 1-25.

* cited by examiner

FIG. 1
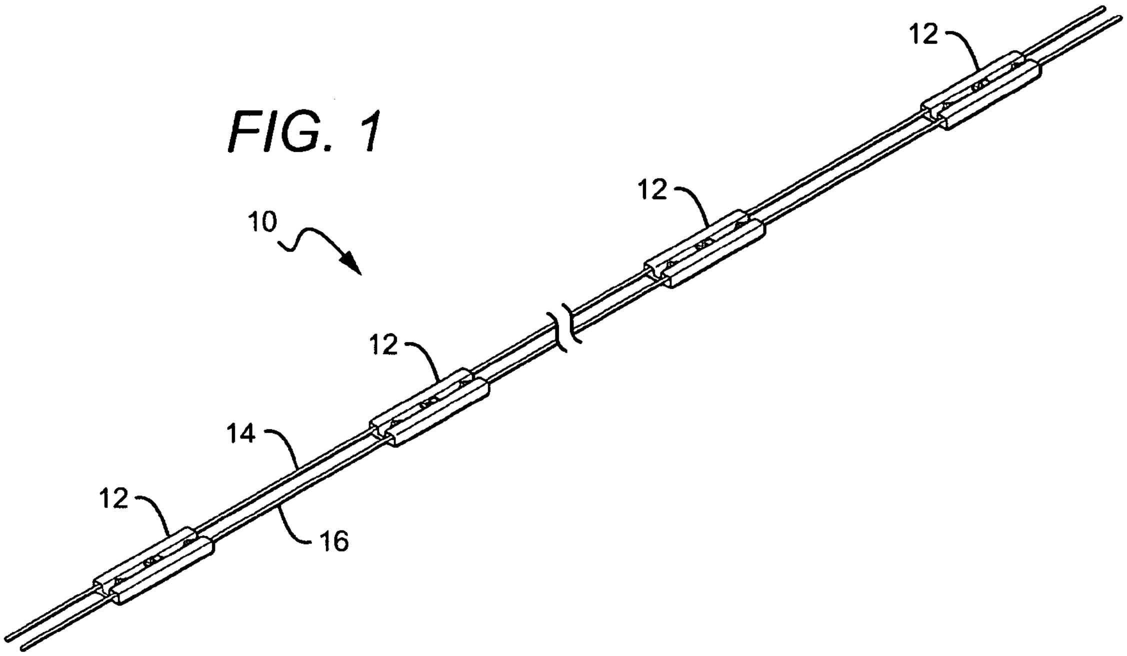
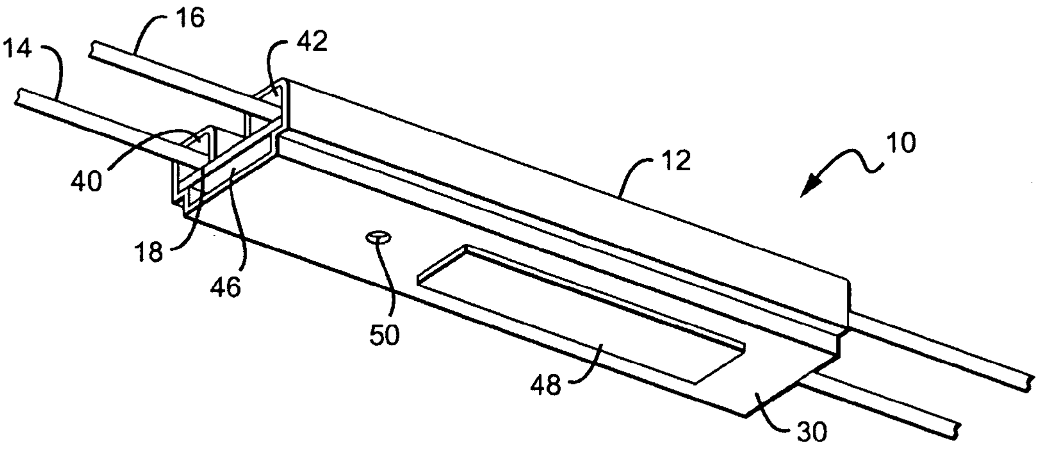
FIG. 2

FIG. 5
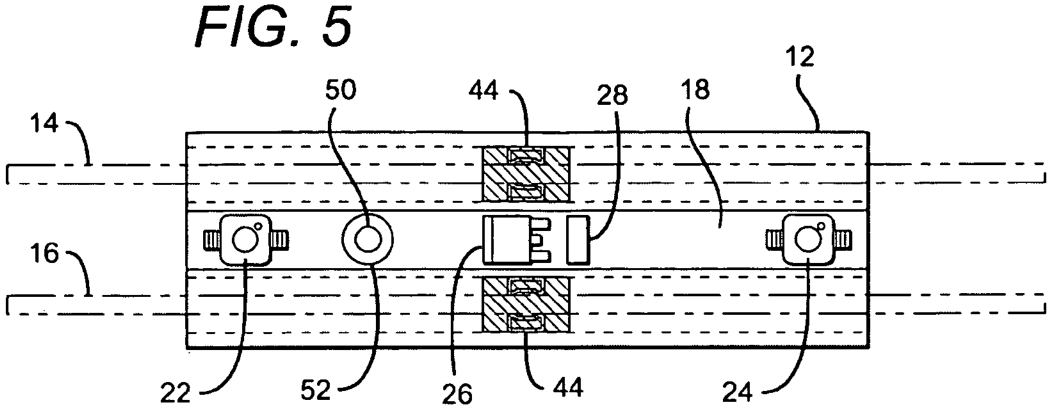
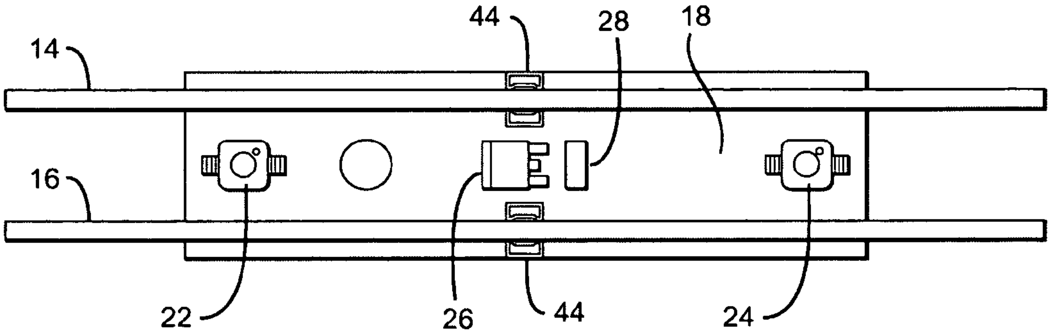
FIG. 6
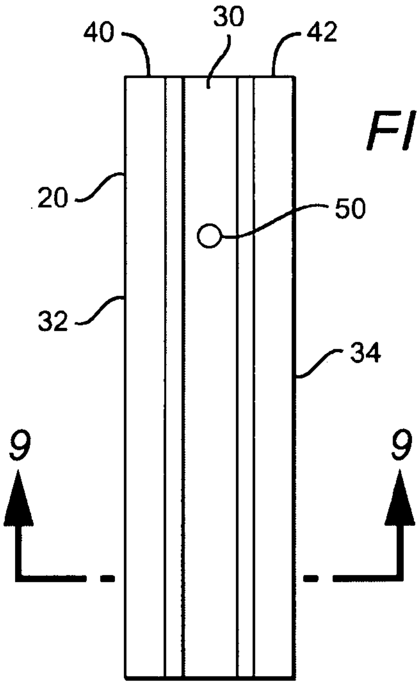
FIG. 8
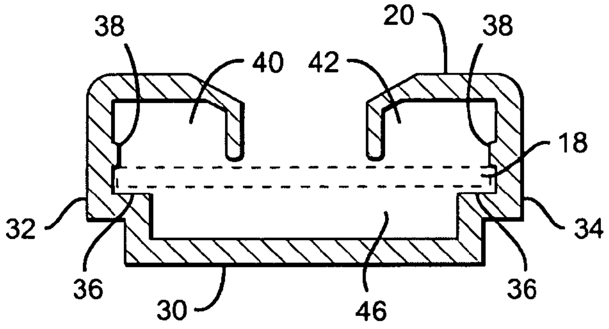
FIG. 9

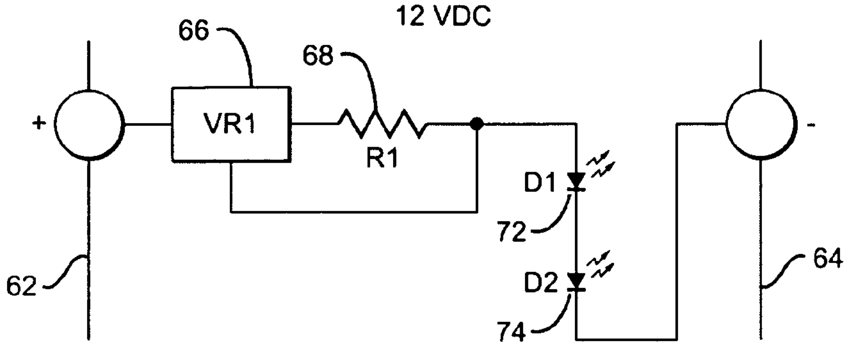
FIG. 10
FIG. 11
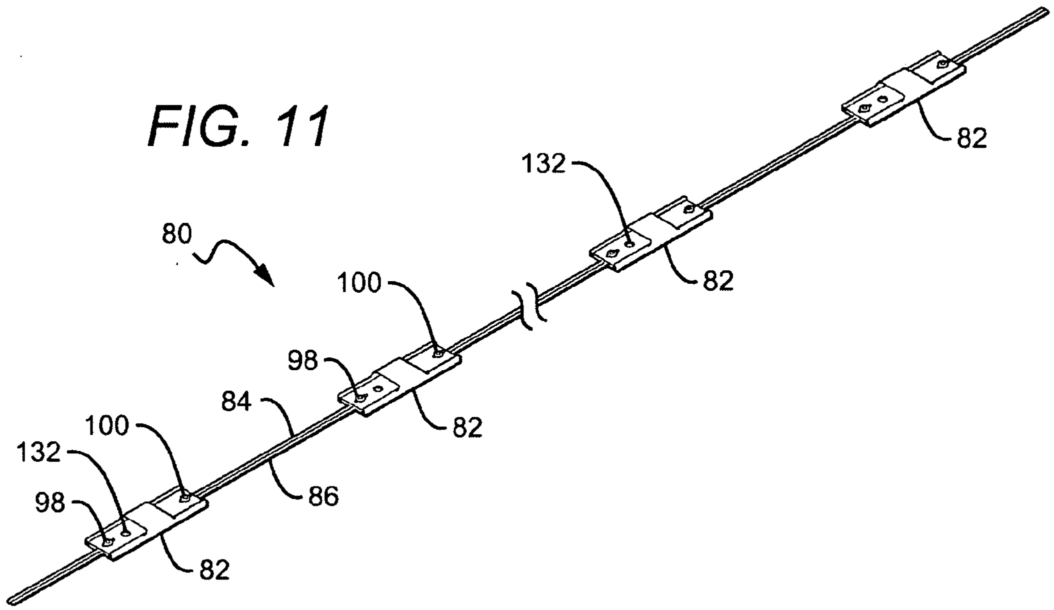
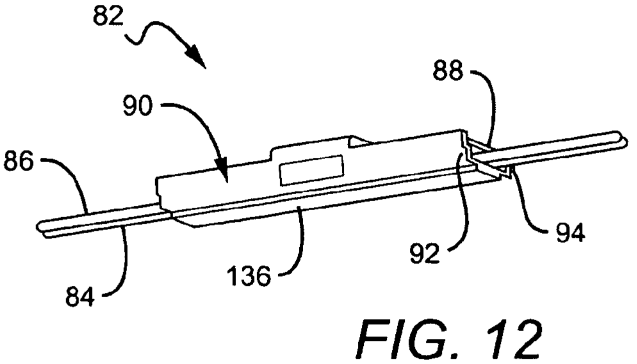
FIG. 12

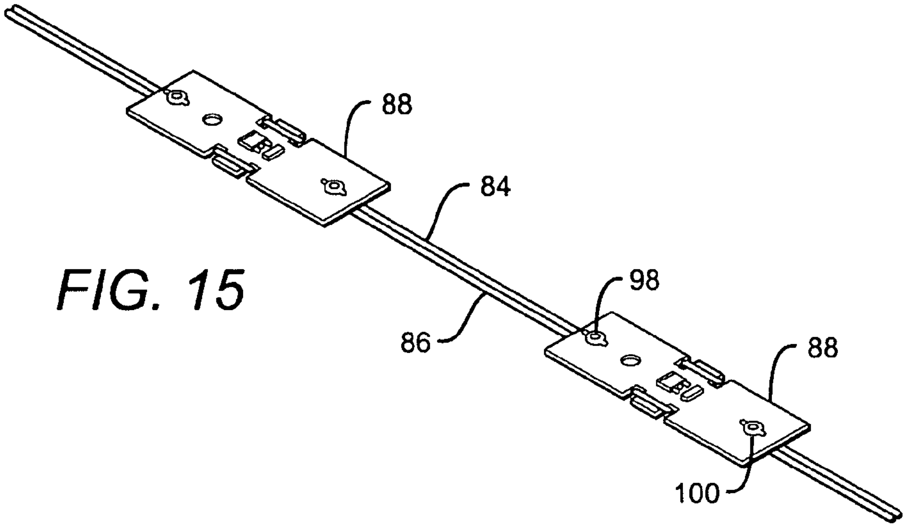
FIG. 15
FIG. 17
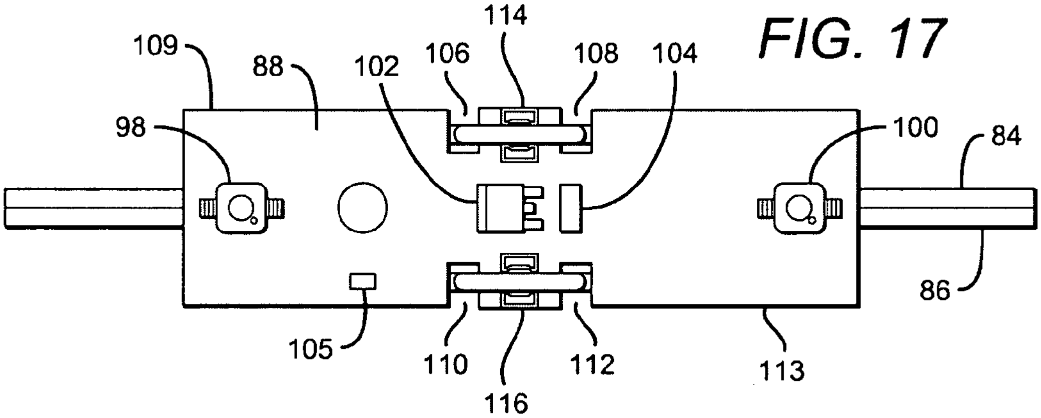
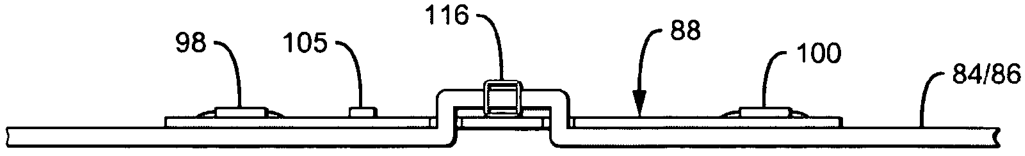
FIG. 18

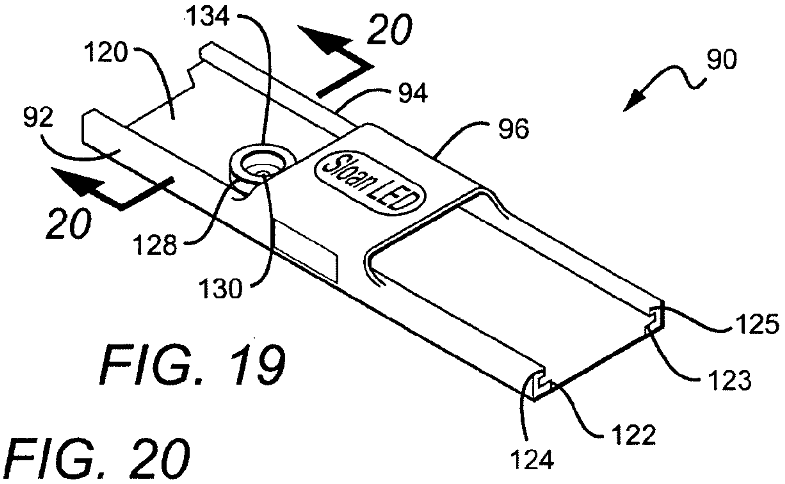
FIG. 19
FIG. 20
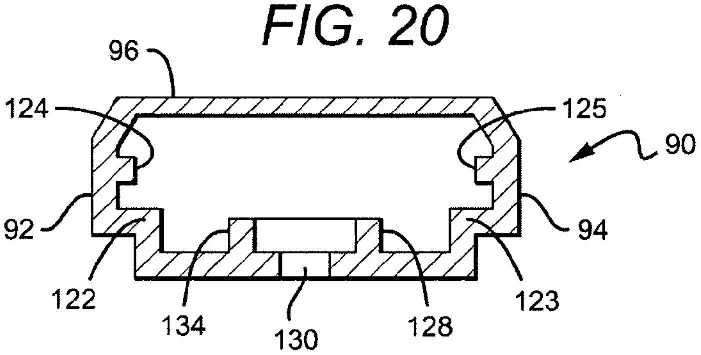
FIG. 21
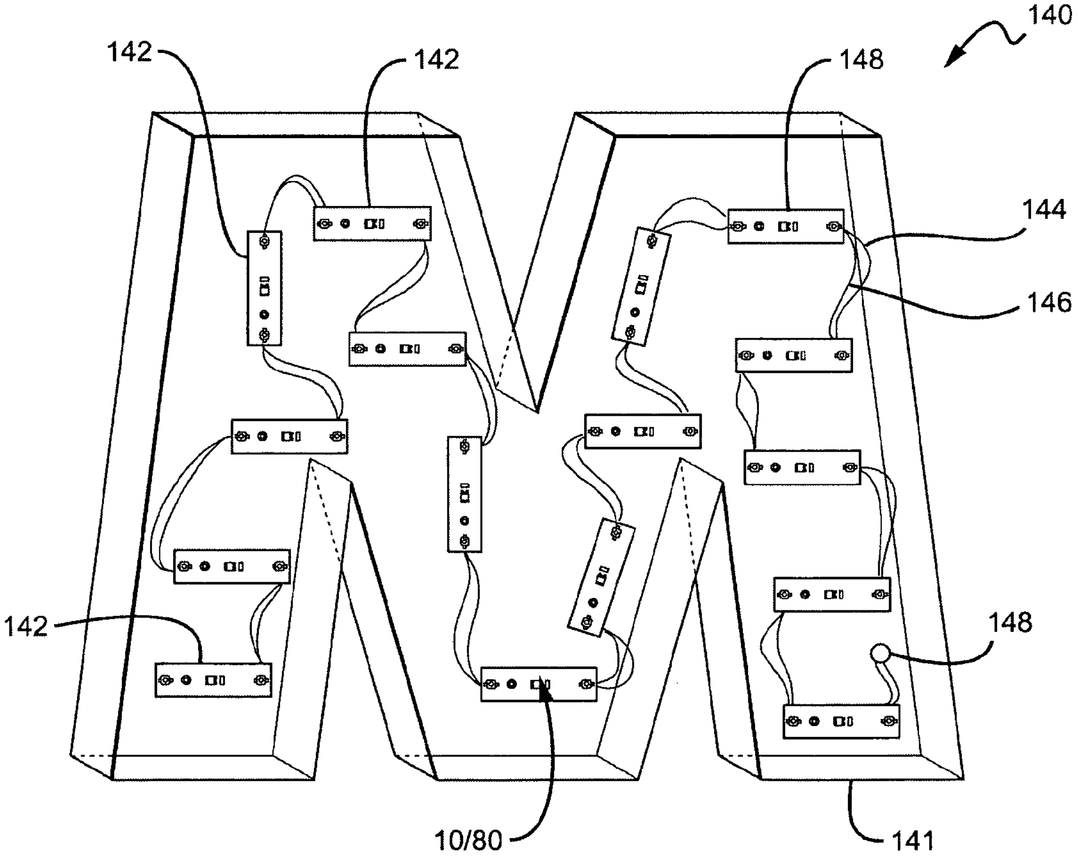

CHANNEL LETTER LIGHTING SYSTEM USING HIGH OUTPUT WHITE LIGHT EMITTING DIODES

This application claims the benefit of provisional application Ser. No. 60/562,483 to Sloan et al., which was filed on Apr. 14, 2004.

BACKGROUND OF THE INVENTION

1. Field of the Invention

This invention relates to lighting units using light emitting diodes (LEDs) and more particularly to LED based lighting units for illuminating channel letters.

2. Description of the Related Art

Recent developments in LEDs have resulted in devices that are brighter, more efficient and more reliable. LEDs are rugged, consume less power, have a relatively long life (up to 100,000 hours), operate at low voltage, and are 30 to 70% more energy efficient than conventional lights, such as incandescent, neon or fluorescent bulbs.

Channel letters are commonly found on the outside of buildings and are often used to advertise the name of the business. They are typically constructed of an aluminum or plastic housing having the shape of a letter and is approximately 5" deep. The housing has a generally U-shaped cross-section, with the top opening in the housing covered by a colored translucent lens that transmits light from within the housing.

Channel letters are typically illuminated with neon or fluorescent light sources that are mounted within the channel letter housing. Neon and fluorescent lights provide a bright and continuous light source that allows the channel letters to be visible at night. These light sources, however, have a relatively short life (20,000 hours), are fragile, operate at high voltage (7,000 to 15,000 volts for neon) and can consume a relatively large amount of power. Neon bulbs can also experience difficulty with cold starting, which can lead to the bulb's failure.

LEDs are more frequently being used as the light source in many different applications. U.S. Pat. No. 5,697,175, to Schwartz, discloses a low power illuminated sign that is particularly adapted for use with common EXIT signs over doorways. The back of each sign comprises a reflector with a series of cavities with curved surfaces. Each cavity corresponds to a letter and background area in the sign. LEDs are mounted in the center of the cavities to illuminate the letters or background area. The LEDs are provided on a separate perpendicular circuit board or on a central projection formed in the bottom of the cavities, with light from the LEDS directed outward. The letters and background area of the sign are illuminated by light reflecting forward from the curved surfaces of the cavities, so that the only visible light is from the illumination of the cavities.

U.S. Pat. No. 6,042,248, to Hannah et al., discloses an LED assembly for channel letter illuminating signs having an enclosure/housing covered by a translucent lens. Each sign includes a plurality of track moldings at the base of its enclosure, with the moldings running along the longitudinal axis of the sections of the channel letter. Linear arrays of LEDs are mounted on printed circuit boards (PCBs) that are then mounted in the track moldings. Each track molding can hold two PCBs in parallel with each of the PCBs arranged on a longitudinal edge, with the LEDs directed outward.

LED based channel letter lighting is also available from LumiLEDs, Inc., under part numbers HLCR-KR-R0100 and HLCR-KR99-R0200, which comprises LEDs that are each mounted by insulation displacement connectors (IDC) on two inch centers. The chain of LED modules is then mounted into a bendable clip or rail, each of which are then mounted inside a channel letter to hold the LEDs in place. Power is provided by a combination of an AC/DC mother power supply and a DC/DC daughter power supply. A sensing LED is also included as a temperature and current sensor.

SUMMARY OF THE INVENTION

The present invention comprises lighting units and systems that can be used to illuminate structures such as illumination of channel letters. One embodiment of a lighting unit according to the present invention comprises a housing and a printed circuit board (PCB) mounted to said housing. The PCB has a plurality of light emitting elements An electrical signal is applied to the light emitting elements causing them to generate light that emits substantially away from the housing. The PCB has a conductive core conducting heat from said light emitting elements, with the PCB mounted within said housing to allow heat from said PCB to dissipate into the surrounding ambient. A constant current device is also mounted on said PCB, accepts an electrical signal and provides a constant current to said light emitting elements. The unit further comprises a mounting mechanism for mounting the unit to a structure.

One embodiment of a lighting system according to the present invention comprises a plurality of electrically connected lighting units, comprises conductors to provide an electrical signal to each of the units. Each of the units comprises a housing and a printed circuit board (PCB) mounted within the housing. The PCB has a plurality of light emitting elements with the electrical signal applied to the light emitting elements causing them to generate light substantially away from the housing. The PCB conducts and dissipates heat from the light emitting elements. A space is provided between most of the bottom surface of said PCB and the housing to allow heat from the PCB to dissipate into the surrounding ambient at the PCB's bottom surface. A mounting mechanism is included for mounting said unit to a structure.

One embodiment of a channel letter lighting system according to the present invention comprising a channel letter housing with a translucent channel letter cover. A plurality of electrically connected lighting units are mounted to the channel letter housing and conductors provide an electrical signal to each of the units. Each of the units comprises a lighting unit housing and a printed circuit board (PCB) mounted within said lighting unit housing. The PCB has a plurality of light emitting elements with the electrical signal applied to the light emitting elements causing them to generate light substantially away from the housing. The PCB conducts and dissipates heat from the light emitting elements and a space is provided between most of the bottom surface of said PCB and the lighting unit housing to allow heat from the PCB to dissipate into the surrounding ambient at the bottom surface. A mounting mechanism is included for each unit to said channel letter housing.

These and other further features and advantages of the invention will be apparent to those skilled in the art from the following detailed description, taken together with the accompanying drawings, in which:

BRIEF DESCRIPTION OF THE DRAWINGS

FIG. 1 is a top perspective view of one embodiment of a lighting system according to the present invention;

FIG. 2 is a bottom perspective view of one of the lighting units in the lighting system shown in FIG. 1;

FIG. 5 is a top view of a lighting unit used in the lighting system shown in FIG. 1, showing wiring running between the units;

FIG. 6 is a top view of the metal core printed circuit board (PCB) and connecting wires of the unit shown in FIG. 5;

FIG. 8 is a top view of an extrusion that can be used in the lighting system shown in FIG. 5;

FIG. 9 is a sectional view of the extrusion in FIG. 8, taken along section lines 9-9;

FIG. 10 is schematic showing how the electronic components of the lighting unit in FIG. 5 are interconnected;

FIG. 11 is a top perspective view of another embodiment of a lighting system according to the present invention;

FIG. 12 is a bottom perspective view of one of the lighting units in the lighting system shown in FIG. 12;

FIG. 15 is a top perspective view of one embodiment of interconnected PCBs that can be used in a lighting system shown in FIG. 1;

FIG. 17 is a top view of one of the PCBs in the interconnect PCBs shown in FIG. 15;

FIG. 18 is a side view of the PCB shown in FIG. 17;

FIG. 19 is a top perspective view of one embodiment of a molded body that can be used in one of the lighting units of the lighting system shown in FIG. 11;

FIG. 20 is a sectional view of the molded body shown in FIG. 19, taken along section lines 20-20 and FIG. 21 is plan view of a channel letter using one embodiment of a lighting system according to the present invention.

DETAILED DESCRIPTION OF THE INVENTION

Figure 3:
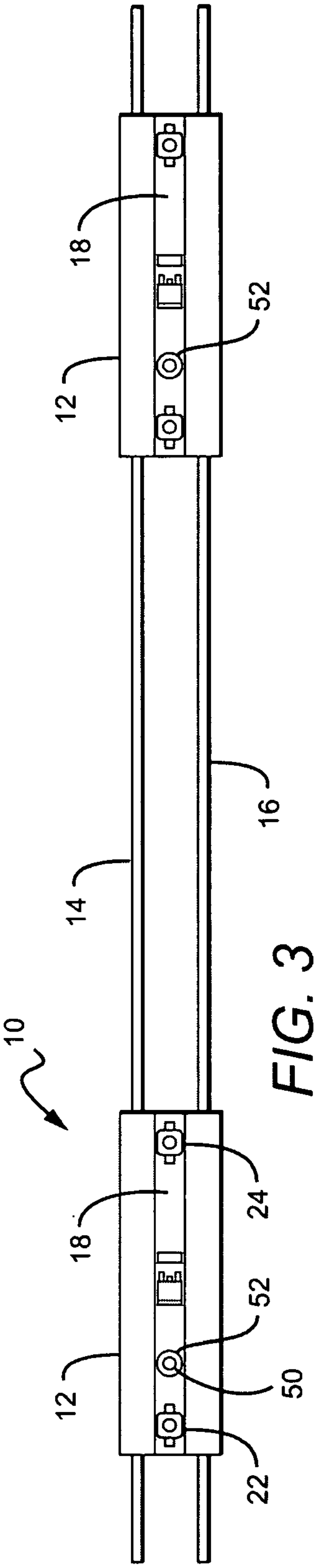
FIG. 3 is a top view of the lighting system shown in FIG. 1.
Figure 4:
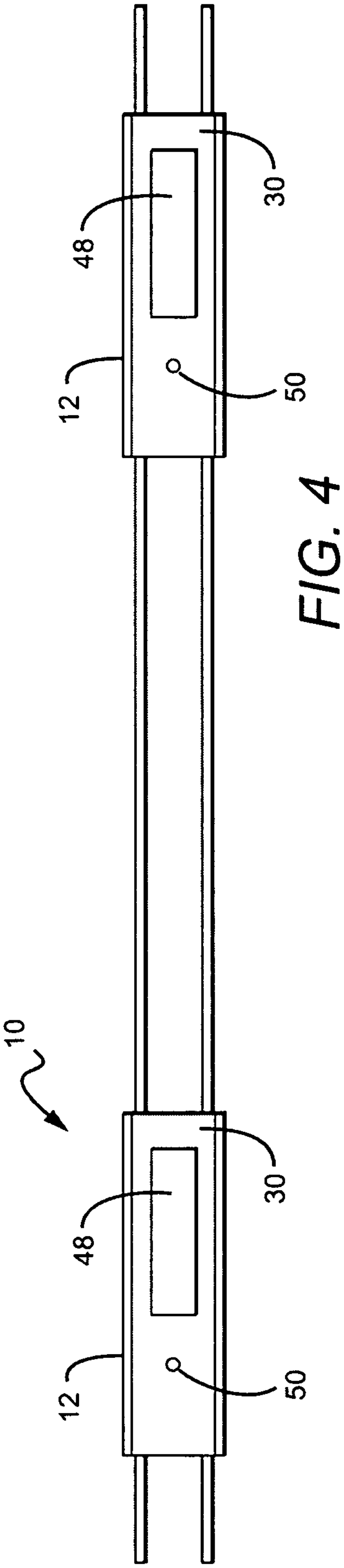
FIG. 4 is a bottom view of the lighting system shown in FIG. 1.

The present invention provides a lighting system for use in lighting different structure, such as channel letters. The system provides connected lighting units that are particularly adapted for use with high power, high luminous flux light emitters, such as light emitting diodes (LEDs). As fully described below, systems according to the present invention provide many features for efficient installation and operation.

FIG. 1 shows one embodiment of a lighting system 10 according to the present invention that comprises a number of lighting units 12 daisy-chained together by first and second electrical conductors 14, 16. Each of the lighting units 12 has first and second light elements 22, 24 (described below) that illuminate out from the unit 12. The electrical conductors 14, 16 conduct electricity to the units 12 to illuminate the light elements 22, 24. An electrical signal applied to the conductors 14, 16 at one end of the lighting system 10 is conducted to each of the units 12 so that the light elements 22, 24 on each of the units 12 simultaneously emit light. The units 12 are particularly adapted to being mounted in channel letters each of which has a transparent or translucent cover. With a translucent cover, when the light elements are illuminated in the channel letters, the light is diffused to give the appearance that the channel letters have a continuous light source.

Figure 7:
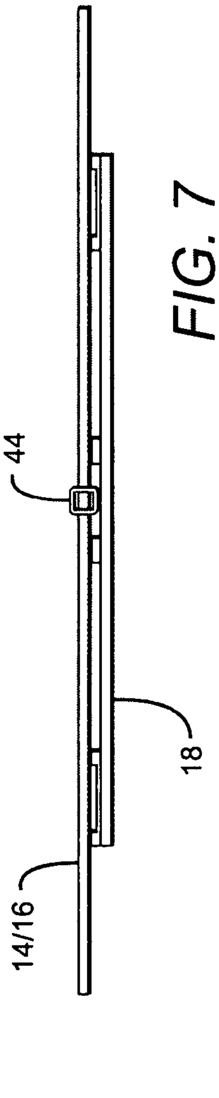
FIG. 7 is a side view of the PCB and wires shown in FIG. 6.

FIG. 2-5 show the lighting system 10 in FIG. 1 in more detail, with the lighting units 12 and conductors 14, 16 shown from different angles. Each of the units comprises a printed circuit board (PCB) 18 mounted within a lighting unit housing 20. FIGS. 6 and 7 show the PCB 18 without the extrusion and the PCB 18 will be described in more detail with reference to FIGS. 5, 6, 7. PCB 18 has first and second light elements 22, 24 mounted on it, although it is understood that the PCB can have one or more than two lighting elements. The elements 22, 24 are generally mounted along the longitudinal axis of the PCB 18, although they can also be mounted in other locations. The light elements 22, 24 can be any device that emits light in response to an electrical signal, such as incandescent lights, lasers, laser diodes, fluorescent light or neon lights, with the preferred light elements 22, 24 being light emitting diodes (LEDs). The elements 22, 24 can emit different LED colors of different intensities, with a preferred LED emitting high luminous flux white light. Different high flux white LEDs can be used with a suitable one being the LW W5SG Golden Dragon® provided by OSRAM.

The PCB 18 can be any conventional type made from any conventional material, with a preferred PCB 18 being a metal core type PCB. Different types of metal core boards can be used such as an aluminum core board. By being metal core, heat from the light elements conducts into the PCB such that the PCB 18 helps draw away heat from the light elements 22, 24. The PCB then provides a larger surface that allows the heat to dissipate into the surrounding ambient. This keeps the light elements 22, 24 cooler, which allows them to operate under a higher current so that they can emit a higher luminous flux.

A constant current device 26 is also mounted on the PCB 18 with the resistor 28, such that each of the units has that same current driving its light elements 22, 24. The light elements 22, 24, constant current device 26 and resistor 28 are interconnected by conductive traces on the PCB using conventional methods. Without a constant current device 26, the system 10 can experience light loss as the power signal passes down the conductors 14, 16 through each of the units 12. This can result in the brightness of the light elements 22, 24 reducing as the signal progresses downstream. This can ultimately result in a channel letter exhibiting different brightness across its cover or by different channel letters in a sign having different brightness. By driving each of the light elements 22, 24 in each of the units 12 with the same current, the light elements along the conductor will have the same brightness. Many different constant current devices can be used, with a suitable device being an LM317M 3-Terminal Adjustable Regulator provided by Texas Instruments, National Semiconductor, and Fairchild Semiconductor. The light elements 22, 24, constant current device 26 and resistor can be either surface mounted or pin mounted to the PCB 18, with the preferred method being surface mounted.

FIGS. 8 and 9 show the lighting unit housing 20 without the PCB and the housing 20 will be described with reference to FIGS. 2-5, 8 and 9. The housing 20 can be made of many conductive, semi-conductive and non-conductive materials, with a preferred material being plastic and can be made using many known processes such as by extrusion or injection molding. The housing 20 is generally U-shaped with the housing base 30 being flat so that it can be adjacent a mounting surface, such as a surface of a channel letter. The first and second sides 32, 34 of the housing 20 extend up from the base 30 and then widen out as they proceed up. A shelf 36 is provided upon which the PCB 18 rests, with the PCB 18 being parallel to the base 30. The inside surface of each of the sides 32, 34 also has a PCB lip 38 that extends over and holds the PCB 18 in place on the shelf 36.

As best shown in FIGS. 2 and 8, the tops of the side surfaces 32, 34 extend back toward each other and then down toward the PCB 18 and base 30 until they make contact with, or are very close, to the PCB 18. This arrangement forms first and second channels 40, 42, with each of the channels 40, 42 defined on three sides by the housing 20 and defined on the fourth side by the PCB 18. The light elements 22, 24, constant current device 26 and resistor 28 are arranged on the PCB, between the channels 40, 42 so that the channels do not block the light emitting from the elements 22, 24.

The PCB 18 is held in place within the housing 20 by the shelf 36, lip 38, and the part of the housing 20 that forms the channels 40, 42. As described above, each of the units 12 is coupled to conductor 14, 16 so that an electrical signal on the conductors 14, 16 can be applied to each of the units 12. In one embodiment according to the present invention, each of the conductors 14, 16 runs down a respective one of the channels 40, 42 and is electrically coupled to and held in place at the PCB 18 by a connector. Many different devices can be used for connector 44, with a preferred device being a commercially available insulation displacement connector (IDC). The IDC connectors 44 can be arranged to allow the conductors 14, 16 to run down the channels 40, 42 with each of the IDC connectors 44 electrically coupling the signal on the conductors 14, 16 to its respective one of the units 12, without interrupting the signal traveling down the conductors 14, 16. The signal from the conductors 14, 16 is conducted to the electrical traces on the PCB through its respective IDC. This arrangement allows for the units 12 to be daisy-chained along the conductors 14, 16 without the conductors 14, 16 being interrupted. The channels provide protection to the conductors 14, 16 and connectors 44 and also provide for a rugged mounting arrangement for the PCB 18. To further protect and strengthen the connection between the conductors 14, 16 and the connectors 44, the channel around the connectors 44 can be filled with a material to cover and seal the connectors 44. Many different materials can be used, with a suitable material being a commercially available silicone provided by Dow Corning.

The PCB 18 and housing 20 arrangement according to the present invention also provides for improved heat dissipation from the light elements 22, 24 and the PCB 18. A space 46 is provided between the PCB 18 and the base 30 of the housing 20. This space allows air to flow through the housing during operation, between the PCB 18, which allows heat to dissipate from the bottom surface of the PCB 18. Without this space, heat from the light elements 22, 24 could only dissipate from the top surface of the PCB, which would limit the PCB heat dissipation capabilities. By providing the space 46, a higher current can be applied to the light elements 22, 24 such that they can emit a higher luminous flux.

Referring to FIGS. 2-5 and 9, each housing 20 can be mounted within a channel letter by many different methods such as by glue, clamp, bolt, weld, etc. As shown, the extrusion can be provided with double sided tape 48 on the outside surface of its base 30 for mounting. Many different double sided tapes can be used, with a preferred tape being a commercially available double sided foam tape provided by 3M Corporation. The housing 20 can also be provided with an alternative mounting method that can be used alone or in conjunction with the double sided tape 48. The housing includes an extrusion mounting hole 50 through which a screw, nail or rivet can pass to mount the housing 20. The PCB 18 also comprises a PCB mounting hole 52 in alignment with the extrusion mounting hole 50. The PCB mounting hole 52 is larger than the housing mounting hole and allows for a screw, nail or rivet to pass through the PCB 18 and into the housing 20 when mounting one of the units 12 a structure, such as a channel letter. In one embodiment according to the present invention a screw can pass through the PCB mounting hole 52 and into the housing mounting hole 50. A screwdriver can then pass through the PCB mounting hole 52 to turn the screw into the channel letter, through the housing mounting hole 50.

FIG. 10 is a schematic showing one embodiment of a circuit 60 for the electronic components that can be included on the PCB 18 shown and described above. The signal is applied to the circuit 60 along first and second conductors 62, 64. A constant current device 66 (described above) and a resistor 68 are coupled together in a known manner to provide a constant current to the first and second light elements 72, 74. The light elements 72, 74 can be any of the emitting devices described above, but are preferably white emitting LEDs with a high luminous flux, as described above. The interconnections between the electronic components are typically provided by the conductive traces on the PCB.

FIG. 11 shows one embodiment of a lighting system 80 according to the present invention that comprises a number of lighting units 82 also daisy-chained together by first and second electrical conductors 84, 86. Conductors 84, 86 can comprise commercially available insulated wire and each can run separately between the units 82. Alternatively, as shown they can be bonded together between the units 82 which can make the system 10 more convenient to install. The conductors 84, 86 can comprise one or more indicators to designate the respective polarity of the conductors. In one embodiment, one of the conductors can comprise a stripe of a different color than the insulating material to indicate the different polarities.

Similar to the lighting units 12 in lighting system 10 described above in FIGS. 1-7, each of the lighting units 82 has light elements 98, 100 that illuminate out away from the unit 82 and the electrical conductors 84, 86 conduct electricity to the units 82 to illuminate the light elements 98, 100. An electrical signal applied to the conductors 84, 86 at one end of the lighting system 80 is conducted to each of the units 82 so that the light elements 83 on each of the units simultaneously emit light. The units 82 are also particularly adapted to being mounted to structures, such as in channel letters with translucent covers to diffuse the emitter light to give the appearance that the channel letters have a continuous light source.

Figure 13:
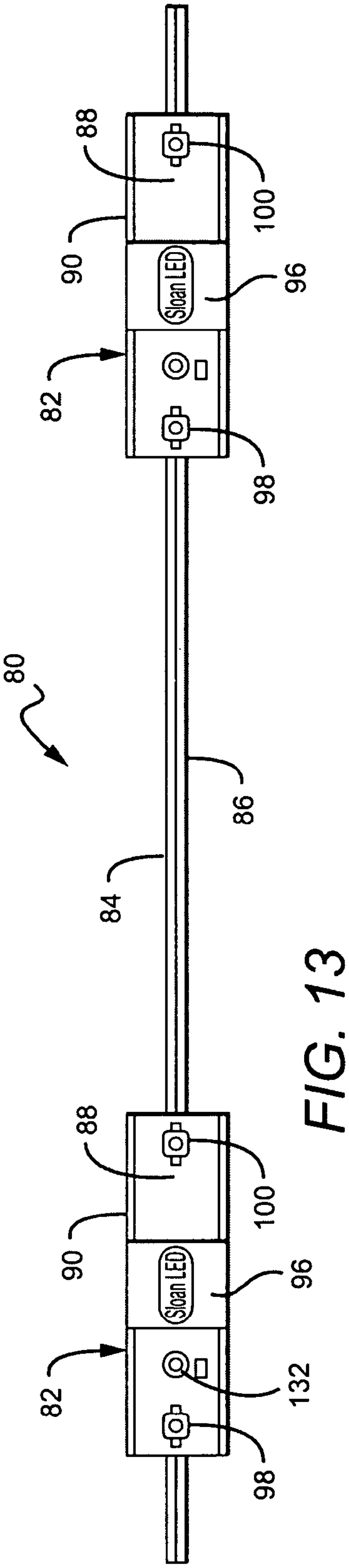
FIG. 13 is a top view of the lighting system shown in FIG. 11.
Figure 14:
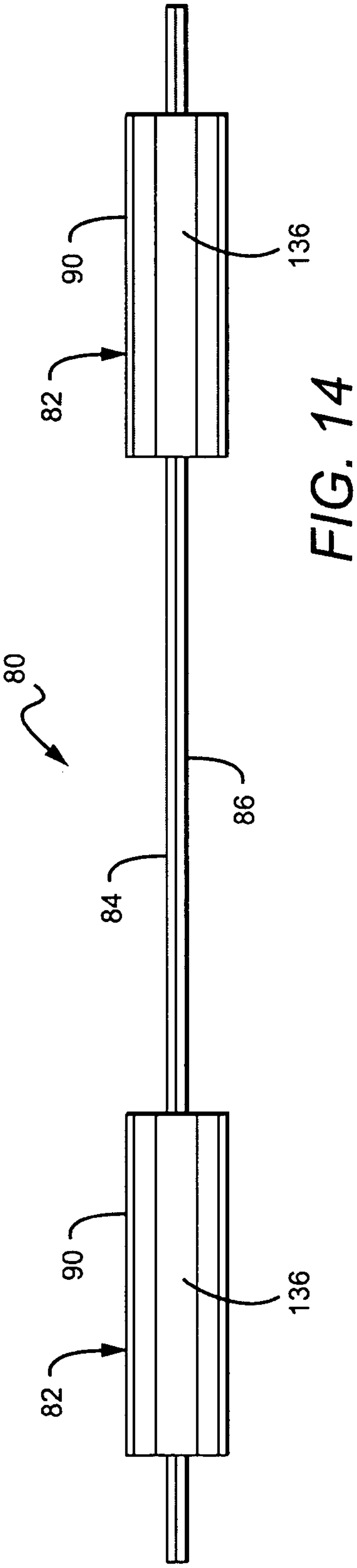
FIG. 14 is a bottom view of the lighting system shown in FIG. 1.
Figure 16:
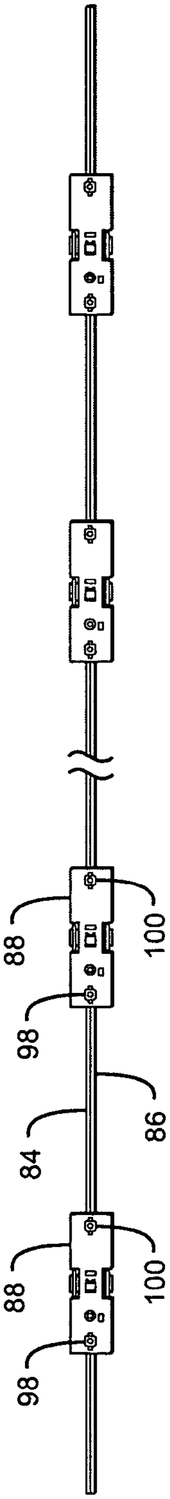
FIG. 16 is top view of the interconnected PCBs shown in FIG. 15.

FIGS. 12-14 show the lighting system 80 and the lighting units 82 in more detail. Each of the units 82 comprises a printed circuit board (PCB) 88 mounted within a housing 90. FIGS. 15-18 show the PCB 88 without the housing, with FIGS. 19 and 20 showing the housing 90 separate from PCB 88. The housing 90 can be made of many different materials, with a preferred material being a plastic. Alternatively, the housing 90 can made of a metal, such as aluminum. The housing comprises a protective bridge 96 which can make manufacturing by typical extrusion processes very difficult. Other manufacturing methods can be used, with a preferred method being known injection molding processes. The housing 90 is arranged to hold the PCB 88 so that the lighting elements emit light away from the housing 90 and PCB 88. The housing has first and second vertical sections 92, 94 and a protective bridge 96 spanning between the vertical sections 92, 94 above the PCB 88. The bridge 96 is arranged to pass over at least some of the emitter drive electronics as described below, and also to assist in mounting the units 82 in channel letters for operation.

Referring now to FIGS. 15-18, PCB 88 has first and second light elements 98, 100 mounted on it, although it is understood that the PCB 88 can have one or more than two lighting elements. Similar to elements 22, 24 described above in FIGS. 1 to 7, elements are generally mounted along the longitudinal axis of the PCB 88, although they can also be mounted in other locations. The light elements 98, 100 can be different devices that can emit different wavelengths of light in response to an electrical signal, such as various incandescent lights, lasers, laser diodes, fluorescent light or neon lights, with the preferred light elements 98, 100 being high flux white light emitting diodes (LEDs), such as the commercially available LW W5SG Golden Dragon® provided by OSRAM.

The PCB 88 is similar to the PCB 10 is system 10, described above and be can be any conventional type made from any conventional material, with a preferred PCB 18 being an aluminum metal core PCB that helps draw away heat from the light elements 98, 100. The PCB then provides a larger surface that allows the heat to dissipate into the surrounding ambient. This keeps the light elements cooler, which allows them to operate under a higher current so that they can emit a higher luminous flux.

A constant current device 102 (best shown in FIGS. 15-18) is also mounted on the PCB 88 with a resistor 104, and diode 105, with these components interconnected using conventional methods. The constant current device 102 at each of the units 82 provides substantially similar current driving its light elements 98, 100. As discussed above, device 102 maintains constant current at each of the units 82 so that units do not experience reduced brightness as the power signal passes down the conductors 84, 86 through each of the units 82. The same constant current device as described above can be used, and the components can be mounted to the PCB 88 using surface mount or pin mount techniques.

As best shown in FIG. 17, each PCB 88 also first and second notches 106, 108 and first starting from a first edge 109 of the PCB 88 and extending partially into the PCB 88, and third and fourth notches 110, 112 starting from the opposite edge 113 extending partially into the PCB 88. According to the present invention, first and second conductors 84, 86 run primarily under the PCB 88, between the PCB 88 and the bottom surface of the housing 90. The first conductor 84, passes to the top of the PCB 88 through first notch 106 and back under the PCB 88 through second notch 108, such that the conductor 84 runs on the top surface of the PCB 88 between the first and second notches 106, 108. Similarly, conductor 86 runs on the top surface of the PCB 88 between third and fourth notches 110, 112. The conductors preferably make electrical contact with conductive traces at the top surface of the PCB. 88 to supply the electrical signal to the unit. Many different connecting methods can be used, such as conventional soldering. Alternatively, the first and second conductors 84, 86 can be electrically connected and first and second commercially IDC connectors 114, 116 that are preferably surface mounted to the PCB 88 in electrical contact with the conductive traces. The IDC connectors allow for convenient manufacture of the units 88 compared to other connecting methods. The conductors 84, 88 can be simply press fit into their respective IDC connector 114, 116 with the connector cutting through the insulation of its conductor and making electrical contact while also holding the its conductor.

Running the conductors primarily under the PCB 88 provides certain advantages, including arranging the wires so that they will not interfere with the light from the lighting elements 98, 100, as would be the case with wires running on top of the PCB 88. The constant current device 102, resistor 104, the IDC connectors 114, 116 and top running portions of the conductors 84, 86 are limited to a relatively small area around the middle of the PCB. This area corresponds to the area covered by the housing's bridge 96, so that in an assembled unit 82, these components are protected by the bridge 96 passing over them. This results in units 82 that are more resistant to damage and as a result, are more rugged and reliable.

Referring now to FIGS. 19 and 20, the housing 90 is generally U-shaped with the housing base 120 that is flat so that it can be adjacent to and flat against a mounting surface, such as a surface of a channel letter. The first and second sides 92, 94 of the housing 90 extend up from the base 120 and then widen out moving up. At the widening transition, first and second shelves 122, 123 are provided upon which the PCB 88 rests, with the PCB 18 being parallel to the base 120. The inside surface of each of the sides 92, 94 also has a first and second PCB lips 124, 125 above each side's shelf and extends over and holds the PCB 88 in place on the shelves 122, 123, with the PCB held between the shelves 122, 123 and lips 124, 125.

The housing 90 also has a cylindrical screw boss 128 that extends up from the housing base 120 and is aligned with a base hole 130. Referring to FIGS. 11-14, the PCB 88 also has a PCB hole 132 that has substantially the same diameter as the screw boss 128 so that when the PCB 88 is properly mounted within the housing 90 the boss 128 and PCB hole 132 align, with the bottom surface of the PCB 88 resting on the top edge 134 of the boss 128, shown in FIGS. 19 and 20. The boss 128 provides support for the PCB 88 while also providing an opening to the base hole 130 for mounting the unit 82 to a structure, such as to a channel letter. Different mounting devices can be used, such as a screw, nail, rivet, etc. The boss 128 also prevents the conductors 82, 84 from entering the area where the screw is inserted and tightened down in the base hole 130, which helps prevent damage to the conductors 82, 84 during installation of the unit 82. In a preferred installation procedure, an appropriately sized screw is inserted into the base hole 130 and a screwdriver passes through the PCB hole 132 and into the screw boss 128 to turn the screw into the structure. The screw is then tightened to hold the unit 82 in place.

Referring to FIGS. 12 and 14, each housing 90 can alternatively be mounted to a structure by many different methods such as by glue, clamp, bolt, weld, etc. As shown, the housing 90 can be provided with double sided tape 136, with one side of the tape 136 affixed to the bottom surface of its base 120. The other side of the tape 136 can be used to mount the unit 82 to a structure. Many different double sided tapes can be used, with a preferred tape being a commercially available double sided foam tape provided by 3M Corporation. The screw mounting arrangement discussed above can be used alone or in conjunction with the double sided tape 136. The protective bridge 96 provides a safe and convenient means from holding the unit during installation with minimal risk of damage to the components on the PCB 88. The bridge 96 can also be used as a point to place pressure on the unit 82 during installation using double sided tape. When the unit 82 is placed in the desired location, down pressure can be placed on the bridge 96 to affix the unit in place by the tape 136. The bridge also provides a convenient location to affix information relevant to the unit such as company logo, part number, Underwriters Laboratory (UL) number, patent numbers, etc. This information can be affixed by different methods such as molding, stickers, etc.

Similar to the PCB 18 and extrusion 20 arrangement shown in FIGS. 1-10 above, the PCB 88 and housing 90 arrangement also provides for improved heat dissipation from the light elements 98, 100 and the PCB 88. A space 138 is provided between the PCB 88 and the base 120 of the housing 90. This space allows air to flow through the housing 90 during operation, between the PCB 88 and the base 120, which allows heat to dissipate from the bottom surface of the PCB 88. Without this space, heat from the light elements 98, 100 would primarily dissipate from the top surface of the PCB 88, which would limit the heat dissipation capabilities of the unit 82. The space 138 along with the heat conducting properties of the preferred metal core type PCB allows a higher current to be applied to the light elements 98, 100 so that they can emit a higher luminous flux.

FIG. 21 shows one embodiment of a channel letter 140 according to the present invention having a lighting system 10/80 mounted within it. In the embodiment shown, the system 10/80 contains sixteen (16) units 142 mounted to the bottom surface of the channel letter housing 141. First and second conductors 144, 146 enter the channel letter though a hole 148 in the base and the conductors pass to each of the units 142. Electrical power can be applied to the system 10/80 to illuminate all of the units 142. The conductors 144, 146 are preferably flexible, allowing the units 142 to be mounted at different angles and with different distances between adjacent units 142. This allows the units 142 to be optimally dispersed throughout the channel letter 140 so that when the transparent/translucent cover is mounted over the opening of the channel letter, the channel letter 140 appears as though it has a continuous light source.

The systems 10 (and 80) can be provided in a box, bag, reel, or other devices that the conveniently store the system 10 prior to installation. In the reel arrangement, the system 10 can be wound on a reel and when the system 10 is installed in a channel letter, the appropriate length can be unwound from the reel and installed in a channel letter. The remaining portion of the system can remain on the reel.

Although the present invention has been described in considerable detail with reference to certain preferred configurations thereof, other versions are possible. Lighting units according to the invention can be used for many different applications beyond channel letters. A separate power supply can be used for each channel letter or multiple letters can be powered by a single power supply. In other embodiments, a variable power supply can be used to control the intensity of the light emitters. The lighting unit can be many different sizes and can be used in many different applications beyond channel letters. The PCB can have different numbers of LEDs and can have different electronic components arranged in different ways. The extrusions can take different shapes and can have additional structures to help transfer heat away from the unit. The conductors can be different lengths and instead of running uninterrupted between the units, the conductors can have connectors. This would allow the units to be supplied separately and then connected together when installed. Therefore, the spirit and scope of the invention and should not be limited to the preferred versions described above.

We claim:

1. A lighting system, comprising:

a plurality of electrically connected lighting units, comprising conductors to provide an electrical signal to each of said units, each of which comprises:

a housing;

a printed circuit board (PCB) mounted within said housing and having a plurality of light emitting elements, the electrical signal applied to said light emitting elements causing them to emit light substantially away from said housing, said PCB conducting and dissipating heat from said light emitting elements, said housing and said PCB cooperating to define a substantially open space between the bottom surface of said PCB and said housing to allow heat from said PCB to dissipate into the ambient; and a mounting mechanism for mounting said unit to a structure.

2. The system of claim 1, wherein at least one said PCB in said lighting system comprises a metal core PCB arranged to conduct heat away from said light emitting elements.

3. The system of claim 1, wherein at least one of said light emitting elements comprises a light emitting diode.

4. The system of claim 1, wherein at least one of said light emitting elements comprises a high luminous flux light emitting diode emitting white light.

5. The system of claim 1, wherein each of said units further comprises a constant current device, each of which accepts said electrical signal and provides substantially the same current to the light emitting elements on its respective one of said units.

6. The system of claim 1, wherein said conductors comprise two conductors, each of said units electrically connected to said conductors.

7. The system of claim 6, wherein said units electrically connect to said conductors by insulation displacement connectors.

8. The system of claim 6, wherein two channels are formed between said housing and a top surface of said PCB in each of said units, each of said conductors running down a respective one of said channels in each of said units.

9. The system of claim 6, wherein said conductors run at least partially through said substantially open space in each of said units.

10. The system of claim 9, wherein said PCB in each of said units comprises a plurality of notches which allow said conductors to run along the top surface of said PCB in each of said units, between said notches.

11. The system of claim 10, wherein each of said units is electrically connected to said conductors on the top surface of the unit's said PCB.

12. The system of claim 1, comprising drive electronics for said light emitting elements on each of said unit's PCB, each said housing comprising a protective bridge passing over the top of said electronics.

13. The system of claim 1, wherein said mounting mechanism in at least one of said units comprises double sided tape.

14. The system of claim 1, wherein said housing in at least one of said units comprises a base and a base hole and wherein said mounting mechanism comprises a screw to cooperate with said base hole.

15. The system of claim 1, wherein said housing in at least one of said units comprises a base, a base hole and a screw boss, and wherein said PCB comprises a PCB hole, said boss aligned with said base hole and said PCB hole extending between said base and said PCB.

16. The system of claim 1, wherein said housing in at least one of said units comprises a base, a base hole, and wherein its said PCB comprises a PCB hole, said base hole and said PCB hole aligned.

17. A lighting unit, comprising:

a housing;

a printed circuit board (PCB) mounted to said housing and having a plurality of light emitting elements, an electrical signal applied to said light emitting elements causing them to emit light substantially away from said housing, wherein said PCB has a conductive core conducting heat from said light emitting elements, said PCB mounted within said housing such that a substantially open space is defined between a bottom surface of said PCB and said housing to allow heat from said PCB to dissipate into the surrounding ambient inside said substantially open space;

a constant current device mounted on said PCB, accepting an electrical signal and providing a constant current to said light emitting elements; and a mounting mechanism for mounting said unit to a structure.

18. The unit of claim 17, wherein said unit further comprises connectors for connecting to conductors and for accepting an electrical signal from said conductors, said electrical signal transmitted to said constant current device.

19. The unit of claim 17, further comprising drive electronics mounted to said PCB, said housing further comprising a protective bridge over most of said drive electronic.

20. A channel letter lighting system, comprising:

a channel letter housing;

a translucent channel letter cover;

a plurality of electrically connected lighting units mounted to said channel letter housing; and conductors to provide an electrical signal to each of said units, wherein each of said units comprises:

a lighting unit housing;

a printed circuit board (PCB) mounted within said lighting unit housing and having a plurality of light emitting elements, said electrical signal applied to said light emitting elements causing them to emit light substantially away from said housing, said PCB conducting and dissipating heat from said light emitting elements, said lighting unit housing and said PCB cooperating to define a substantially open space between a bottom surface of said PCB and said lighting unit housing to allow heat from said PCB to dissipate into the surrounding ambient at said bottom surface; and a mounting mechanism for mounting said unit to said channel letter housing.

21. The system of claim 20, wherein said translucent cover disperses light from said lighting units giving that the appearance that said channel letter is illuminated by a continuous light source.

22. The system of claim 20, wherein at least one said PCB in said lighting units comprises a metal core PCB arranged to conduct heat away from said light emitting elements.

23. The system of claim 20, wherein at least one of said light emitting elements comprises light emitting diode.

24. The system of claim 20, wherein each of said units further comprises a constant current device, each of which provides substantially the same current to said light emitting elements on its respective one of said units.

25. The system of claim 20, comprising drive electronics for said light emitting elements on each of said unit's PCB, each said housing comprising a protective bridge passing over the top of said electronics.

26. The system of claim 20, wherein said mounting mechanism in at least one of said units comprises double sided tape.

27. The system of claim 20, wherein said housing in at least one of said units comprises a hole and wherein said mounting mechanism comprises a screw to cooperate with said hole.

* * * * *